US012641436B2

(12) United States Patent
Choi et al.

(10) Patent No.: US 12,641,436 B2
(45) Date of Patent: May 26, 2026

(54) METHOD AND APPARATUS FOR PROVIDING A SHARED MOBILITY SERVICE

(71) Applicants: HYUNDAI MOTOR COMPANY, Seoul (KR); KIA CORPORATION, Seoul (KR)

(72) Inventors: Jung Hun Choi, Hwaseong-si (KR); Dong Hyun Ha, Seoul (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 533 days.

(21) Appl. No.: 18/128,037

(22) Filed: Mar. 29, 2023

(65) Prior Publication Data

US 2024/0147242 A1     May 2, 2024

(30) Foreign Application Priority Data

Oct. 27, 2022    (KR) ......................... 10-2022-0140142

(51) Int. Cl.
| | |
|---|---|
| *H04W 12/63* | (2021.01) |
| *G06Q 50/40* | (2024.01) |
| *H04W 12/06* | (2021.01) |
| *H04W 12/30* | (2021.01) |

(52) U.S. Cl.
CPC ............ *H04W 12/63* (2021.01); *G06Q 50/40* (2024.01); *H04W 12/06* (2013.01); *H04W 12/30* (2021.01)

(58) Field of Classification Search
CPC ..... G04W 12/63; H04W 12/30; H04W 12/06; G06Q 50/40
USPC ............................................................. 726/6
See application file for complete search history.

(56) References Cited

U.S. PATENT DOCUMENTS

| | | | |
|---|---|---|---|
| 2018/0009526 A1* | 1/2018 | Spengler ............... | H04W 4/029 |
| 2022/0099816 A1* | 3/2022 | Eber ....................... | G01S 11/02 |
| 2023/0044015 A1* | 2/2023 | Rezaei ............... | G06Q 10/0631 |
| 2023/0061043 A1* | 3/2023 | Wu ......................... | H04W 72/20 |
| 2024/0094328 A1* | 3/2024 | Choi ..................... | G01S 5/0242 |
| 2024/0179072 A9* | 5/2024 | Ricci ..................... | B60R 16/037 |

* cited by examiner

*Primary Examiner* — Teshome Hailu
(74) *Attorney, Agent, or Firm* — Lempia Summerfield Katz LLC

(57) ABSTRACT

A mobility service providing method and apparatus are provided. The method includes: moving, by a vehicle, to a customer when the customer requests the vehicle to provide a mobility service and forming, by one or more anchors mounted on the vehicle, an Ultra-Wide Band (UWB) link with an information technology (IT) device carried by the customer when a determination is made that a distance between the vehicle and the customer is within a predetermined distance; performing a smart anchor positioning (SAP) algorithm to estimate a position of the IT device; performing position-based security authentication with the customer; and arriving, by the vehicle, at the customer, wherein the one or more anchors and the IT device transmit or receive UWB pulse waves.

18 Claims, 19 Drawing Sheets

— Real Range

---- Estimated Range

START

ONE ANCHOR AND OBJECT FORM LINK ⎯⎯ S910

ESTIMATE DISTANCE dn BETWEEN
OBJECT AND ANCHOR AT POINT IN TIME $t_n$ ⎯⎯ S920

SEQUENTIALLY STORE d1 TO dn IN MEMORY ⎯⎯ S930

SELECT THREE ESTIMATED
DISTANCES FROM AMONG d1 TO dn ⎯⎯ S940

PERFORM TRILATERATION USING
THREE SELECTED ESTIMATED DISTANCES ⎯⎯ S950

END

METHOD AND APPARATUS FOR PROVIDING A SHARED MOBILITY SERVICE

CROSS-REFERENCE TO RELATED APPLICATION

This application claims priority to Patent Application No. 10-2022-0140142, filed on Oct. 27, 2022 in Korea, the entire contents of which are incorporated herein by reference.

TECHNICAL FIELD

The present disclosure relates to a method and an apparatus for providing a shared mobility, i.e., vehicle service. More specifically, the present disclosure relates to a method and an apparatus for providing a shared mobility service by estimating a position of a customer using an Ultra WideBand (UWB) anchor mounted on a vehicle.

BACKGROUND

The content described below merely provides background information related to the present embodiment and does not constitute the related art.

Ultra WideBand (UWB) technology is a near field wireless communication protocol that operates over radio waves at high frequencies. The UWB technology is a radio technology in which a frequency band of 500 MHz or more is used or a numerical value defined as a fractional bandwidth is 25% or more. The fractional bandwidth means a bandwidth of a signal with respect to a center frequency. In other words, UWB is a radio technology in which a broadband frequency is used, and UWB has various advantages, such as high distance resolution, transparency, strong immunity to narrowband noise, and coexistence with other devices that share frequencies. The UWB technology is characterized by very precise spatial recognition and directionality. Mobile devices work to accurately perceive a surrounding environment. Various devices are connected through UWB, so that various functions including securing remote payment and locating a remote control can be performed. Further, since an accurate search can be performed in a large area through UWB, an exact position of a restaurant or car can be ascertained using a smartphone.

In order to provide a shared mobility service using a vehicle, it is important to discern exact positions of the vehicle and an object around the vehicle. The shared mobility service using a vehicle may correspond to car sharing and robot taxi businesses. Since global positioning system (GPS)-based positioning technology has an average error of 2 to 5 m in precision of positioning, there is a problem in providing the shared mobility service. Accordingly, it is necessary to provide an accurate shared mobility service by discerning exact positions of a vehicle and an object around the vehicle using UWB technology.

SUMMARY

According to the present disclosure, a mobility service providing method includes moving, by a vehicle, to a customer when the customer requests the vehicle to provide a mobility service and forming, by one or more anchors mounted on the vehicle, an Ultra WideBand (UWB) link with an information technology (IT) device carried by the customer when a determination is made that a distance between the vehicle and the customer is within a predetermined distance. The method also includes performing a smart anchor positioning (SAP) algorithm to estimate a position of the IT device. The method also includes performing position-based security authentication with the customer. The method also includes arriving, by the vehicle, at the customer. The one or more anchors and the IT device transmit or receive UWB pulse waves.

A mobility service providing apparatus includes a memory and a plurality of processors. At least one of the plurality of processors causes a vehicle to move to a customer when the customer requests the vehicle to provide a mobility service and causes one or more anchors mounted on the vehicle to form a UWB link with an IT device carried by the customer when a determination is made that a distance between the vehicle and the customer is within a predetermined distance. The at least one of the plurality of processors also performs a smart anchor positioning (SAP) algorithm to estimate a position of the IT device. The at least one of the plurality of processors also performs position-based security authentication with the customer. The vehicle arrives at the customer. The one or more anchors and the IT device transmit or receive UWB pulse waves.

DETAILED DESCRIPTION

Figure 1:
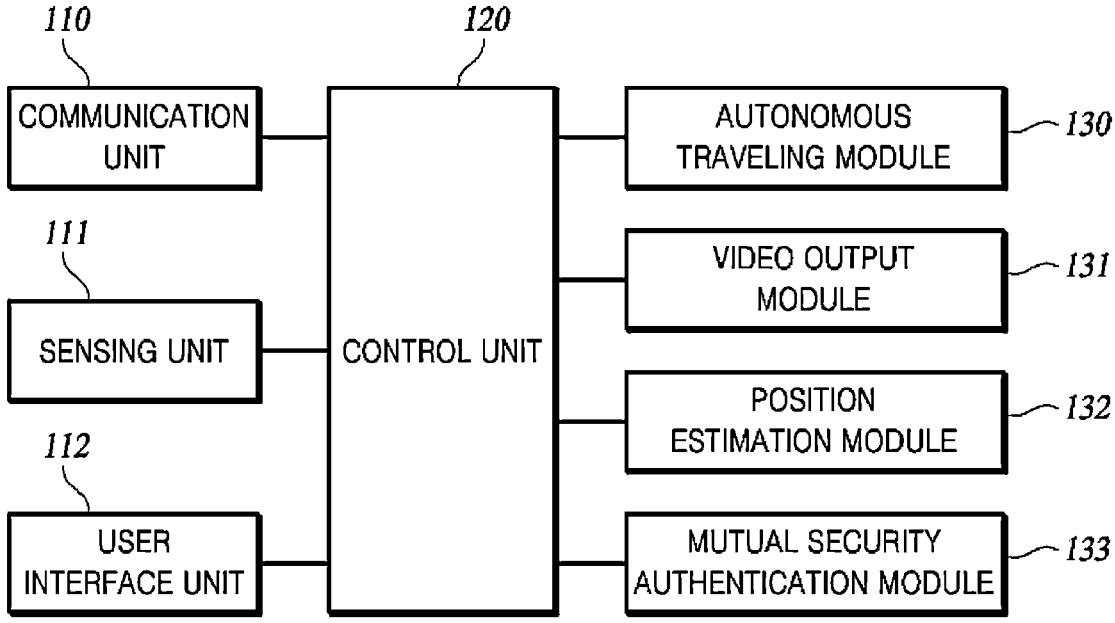
FIG. 1 is a diagram illustrating a control device mounted on a vehicle according to an embodiment of the present disclosure.

An object of the present disclosure is to provide a method and an apparatus for providing a shared mobility service in an area in which global positioning system (GPS) reception is unavailable.

Further, an object of the present disclosure is to provide a method and an apparatus for performing position-based security authentication with a customer.

Further, an object of the present disclosure is to provide a method and an apparatus for accurately estimating a position of a customer.

Further, an object of the present disclosure is to provide a method and an apparatus for allowing a customer to receive a service provided at a market or the like.

Further, an object of the present disclosure is to provide a method and an apparatus for estimating a position of a customer carrying an information technology (IT) device registered in a vehicle using the IT device.

The problems to be solved by the present disclosure are not limited to the problems described above, and other problems not described should be clearly understood by those having ordinary skill in the art from the following description.

Hereinafter, some embodiments of the present disclosure should be described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, rather than exclude other components, unless specifically stated to the contrary.

The following detailed description, together with the accompanying drawings, is intended to describe embodiments of the present disclosure and is not intended to represent the only embodiments in which the present disclosure may be practiced. When a component, device, element, or the like of the present disclosure is described as having a purpose or performing an operation, function, or the like, the component, device, or element should be considered herein as being "configured to" meet that purpose or to perform that operation or function. The present disclosure describes various components of an object tracking apparatus as units or modules, such as: a communication unit; a sensing unit; a user interface unit; a control unit; an autonomous traveling module; a video output module; a position estimation module; and a mutual security authentication module. Each of these units or modules may separately embody or be included with a processor and a memory, such as a non-transitory computer readable media, as part of the apparatus.

FIG. 1 is a diagram illustrating a control device mounted on a vehicle according to an embodiment of the present disclosure.

Referring to FIG. 1, each autonomous vehicle may include a communication unit 110, a sensing unit 111, a user interface unit 112, a control unit 120, an autonomous traveling module 130, a video output module 131, a position estimation module 132, and a mutual security authentication module 133. The communication unit 110 may transmit or receive information between autonomous vehicles and between an autonomous vehicle and another object over a communication network. The communication unit 110 may transmit or receive information between autonomous vehicles and between an autonomous vehicle and another object through at least one communication scheme among a LAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced).

Further, the communication unit 110 may perform near field communication between autonomous vehicles and between an autonomous vehicle and another object. Since autonomous vehicles travel while maintaining a short distance between the autonomous vehicles, the communication unit 110 may transmit and receive information between the autonomous vehicles and between the autonomous vehicle and the other object through near field wireless communication. In this case, the communication unit 110 allows various types of information to be transmitted and received between autonomous vehicles and between an autonomous vehicle and another object. The information can be transmitted and received through Bluetooth, RFID (Radio Frequency Identification), infrared data communication (IrDA), UWB (Ultra WideBand), ZigBee, NFC (Near Field Communication), Wi-Fi (Wireless-Fidelity), Wi-Fi Direct, Wireless USB (Wireless Universal Serial Bus), or the like.

The sensing unit 111 may include a radar, a camera, a lidar, and the like. The sensing unit 111 may sense a speed and a position of a nearby autonomous vehicle and a speed and a position of a nearby object. The sensing unit 111 may detect any objects, including obstacles, people, animals, tollgates, breakwaters, and the like, in addition to autonomous vehicles. The user interface unit 112 may provide a user interface to a driver. The user interface unit 112 may receive information from the driver and input the information to the control unit 120 or output a result according to an operation. For example, the driver may input information on the nearby autonomous vehicle and information on the nearby object to the user interface unit 112. The user interface unit 112 may input the information on the nearby autonomous vehicle and the information on the nearby object to the control unit 120. The control unit 120 may issue a control command to the autonomous traveling module 130 by using the information on the nearby autonomous vehicle and the information on the nearby object.

The control unit 120 may control the autonomous traveling module 130, the video output module 131, the position estimation module 132, and the mutual security authentication module 133 according to the information received from the communication unit 110, the sensing unit 111, and the user interface unit 112. The control unit 120 may include a trained learning model. The learning model may correspond to a deep learning-based model or a support vector machine model. The control unit 120 may further include a learning unit (not illustrated) for training the learning model in advance. The learning unit can train the learning model in advance using supervised learning, unsupervised learning, semi-supervised learning, and/or reinforcement learning. Here, a specific method by which the learning unit trains the learning model based on learning data is common in a relevant field, and thus a detailed description thereof has been omitted.

The autonomous traveling module 130 may change or maintain a speed, a direction, or the like of the vehicle according to a control command of the control unit 120. The video output module 131 may output an image of a nearby vehicle, a nearby obstacle, a nearby building, or the like to the driver according to the control command of the control unit 120. The position estimation module 132 may estimate a position of the nearby object by using a trilateration technique according to a control command from the control unit 120. The mutual security authentication module 133 may perform authentication using an identifier (ID) between nearby vehicles and between nearby objects according to a control command of the control unit 120. Such authentication may be performed via a UWB. Autonomous vehicles can defend against a spoofing attack of an attacker through such authentication.

Figure 2:
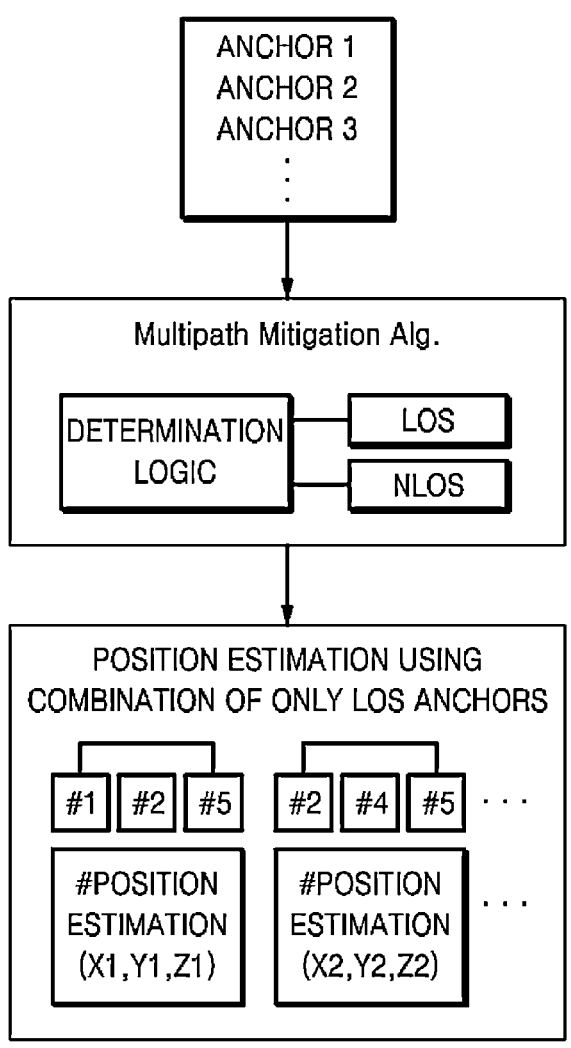
FIG. 2 is a diagram illustrating a process of estimating a position of an object using three line-of-sight (LOS) anchors according to an embodiment of the present disclosure.

FIG. 2 is a diagram illustrating a process of estimating a position of an object using three line-of-sight (LOS) anchors according to an embodiment of the present disclosure. The vehicle has a plurality of UWB anchors mounted therein. The UWB anchor may have the same meaning as an anchor. The LOS may mean a straight distance for electromagnetic waves to be able to travel in a straight line. The non-line-of-sight (NLOS) may mean a distance for the electromagnetic waves to be unable to travel in a straight line due to an obstacle or the like. When a distance between a tag and the anchor corresponds to the straight distance for the electromagnetic waves to be able to travel in a straight line, this anchor may correspond to an LOS anchor. When the distance between the tag and the anchor corresponds to the distance for the electromagnetic waves to be unable to travel in the straight line, the anchor may correspond to an NLOS anchor. The LOS anchors and the NLOS anchors may be distinguished. Three or more anchors are required to apply the trilateration technique. Forming UWB links between three anchors and an object has a higher link formation rate than forming UWB links between four anchors and an object. Forming a UWB link between an LOS anchor and an object has a higher link formation rate than forming a UWB link between an NLOS anchor and an object.

Referring to FIG. 2, a plurality of anchors may be mounted on a vehicle. The plurality of anchors may be classified into LOS anchors and NLOS anchors by using a multipath mitigation algorithm. The multipath mitigation algorithm may correspond to an algorithm for classifying anchors into LOS anchors and NLOS anchors using change in a received spectrum. Alternatively, the multipath mitigation algorithm may correspond to an algorithm for classifying anchors into LOS anchors and NLOS anchors using a histogram of errors. The multipath mitigation algorithm may be performed by a trained learning model of the control unit 120 of FIG. 1. The learning model can perform the multipath mitigation algorithm in consideration of a horizontal length, a tread width, or a height of a nearby vehicle, a distance between nearby vehicles, a speed of nearby vehicles, building density, corner curvature, or the like. The position of the object can be estimated by combining three anchors among the classified LOS anchors and using the trilateration technique. Among the classified LOS anchors, the LOS anchor that has a high rate of formation of a link to the objects in consideration of the horizontal length, the tread width, and the height of the nearby vehicle, the distance between nearby vehicles, the speed of the nearby vehicles, the building density, the corner curvature, or the like may be assigned a weight. The weighted LOS anchor can become a reference anchor and form a link to the object.

The learning model may temporarily determine the anchor mounted on the vehicle to be a LOS anchor and then may finally determine the anchor to be a NLOS anchor in consideration of the horizontal length, the tread width, and the height of the nearby vehicle, the distance between nearby vehicles, the speed of the nearby vehicles, the building density, the corner curvature, or the like. The learning model may temporarily determine the anchor mounted on the vehicle to be an NLOS anchor and then may finally determine the anchor to be an LOS anchor in consideration of the horizontal length, the tread width, and the height of the nearby vehicle, the distance between nearby vehicles, the speed of the nearby vehicles, the building density, the corner curvature, or the like.

For example, five anchors including anchor 1, anchor 2, anchor 3, anchor 4, and anchor 5 are mounted on the vehicle. The five anchors may be classified into LOS anchors and NLOS anchors by using the multipath mitigation algorithm. Here, four anchors including anchor 1, anchor 2, anchor 4, and anchor 5 may be classified into LOS anchors, and anchor 3 may be classified into an NLOS anchor. The position of the object can be estimated by combining three anchors among the four LOS anchors and performing the trilateration technique. The trilateration technique may be performed with each of a combination of anchor 1, anchor 2, and anchor 4, a combination of anchor 1, anchor 2, and anchor 5, a combination of anchor 1, anchor 4, and anchor 5, or a combination of anchor 2, anchor 4, and anchor 5. The position of the object may be estimated according to each combination. An optimal anchor combination having a highest link formation rate and accuracy of the position may be selected using an error minimization objective function. A position of the object estimated by performing the trilateration technique with this optimal anchor combination can be finally used.

Figure 3:
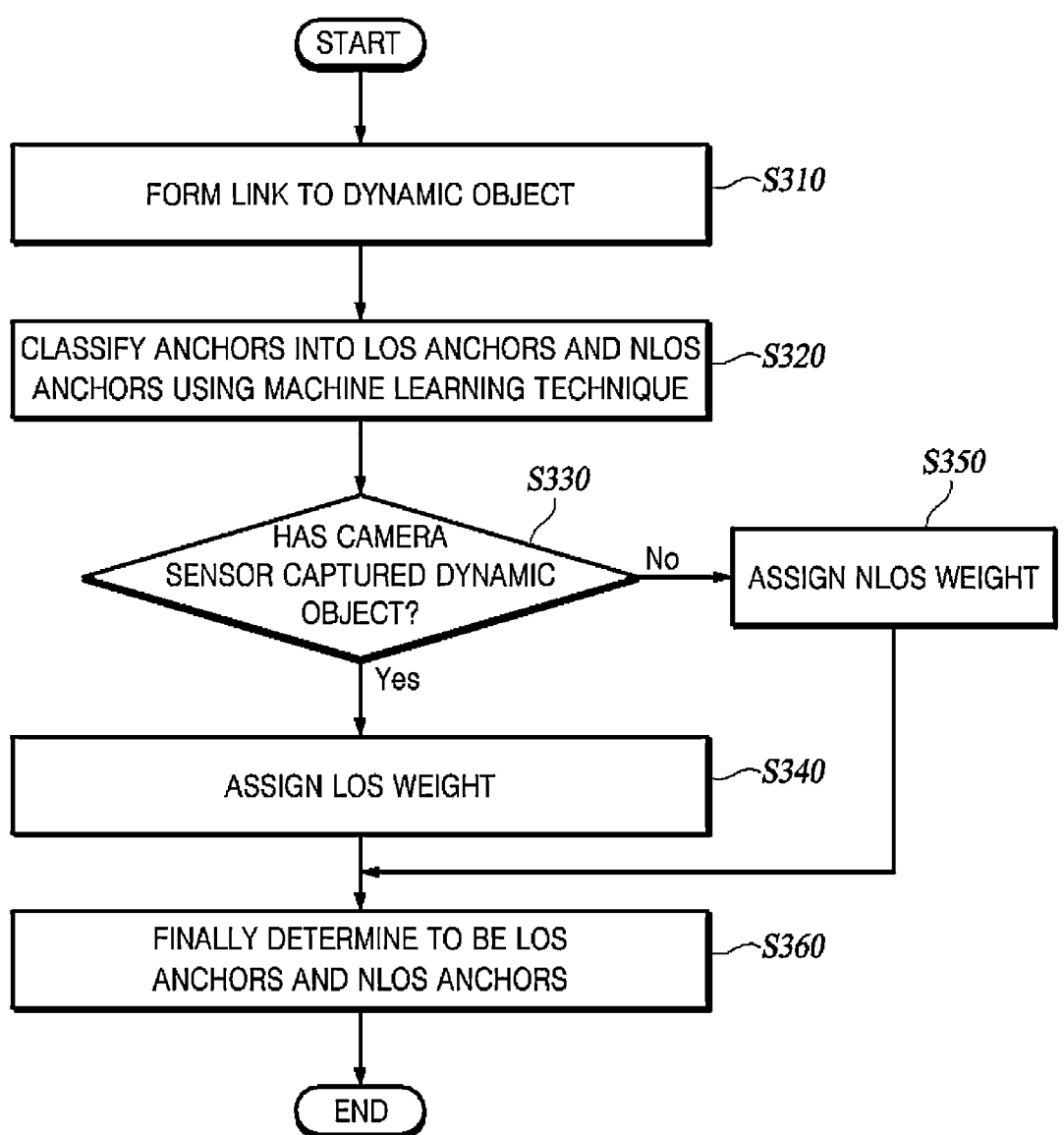
FIG. 3 is a diagram illustrating a process of classifying anchors into LOS anchors and non-line-of-sight (NLOS) anchors using a camera sensor according to an embodiment of the present disclosure.

FIG. 3 is a diagram illustrating a process of classifying anchors into LOS anchors and NLOS anchors using a camera sensor according to an embodiment of the present disclosure.

Referring to FIG. 3, one or more anchors mounted on a vehicle may form a UWB link to a dynamic object (S310). One or more anchors mounted on a vehicle may be temporarily determined to be LOS anchors and NLOS anchors using a machine learning technique (S320). The anchors may be temporarily determined to be the LOS anchor and the NLOS anchor using a deep learning model, a support vector machine model, or a convolution neural network (CNN) model. A determination may be made as to whether a camera sensor mounted on the vehicle has captured the dynamic object (S330). Not only camera sensors, but also various on-board sensors for vehicles, such as a radar or a lidar, may be used. The camera sensors can monitor surroundings of the vehicle based on vision. The camera sensor may determine in real time whether a dynamic object is present around the vehicle. When the camera sensor captures the dynamic object (S330—YES), a LOS weight may be assigned to the temporarily determined LOS anchor or NLOS anchor (S340). When the camera sensor does not capture the dynamic object (S330—NO), an NLOS weight may be assigned to the temporarily determined LOS anchor or NLOS anchor (S350). The one or more anchors mounted on the vehicle may be finally determined to be the LOS anchors and the NLOS anchors by using the LOS weight or the NLOS weight (S360).

Even when the one or more anchors are temporarily determined to be the LOS anchors, the NLOS weight may be applied and the anchors may finally be determined to be the NLOS anchors. Even when the one or more anchors are temporarily determined to be the LOS anchor and the NLOS weight is applied, the one or more anchors may be finally determined to be the LOS anchors. Even when the one or more anchors are temporarily determined to be the NLOS anchors, the LOS weight may be applied and the anchors may be finally determined to be the LOS anchors. Even when the one or more anchors are temporarily determined to be the NLOS anchors and the LOS weight is applied, the one or more anchors may be finally determined to be the NLOS anchors.

Figure 4:
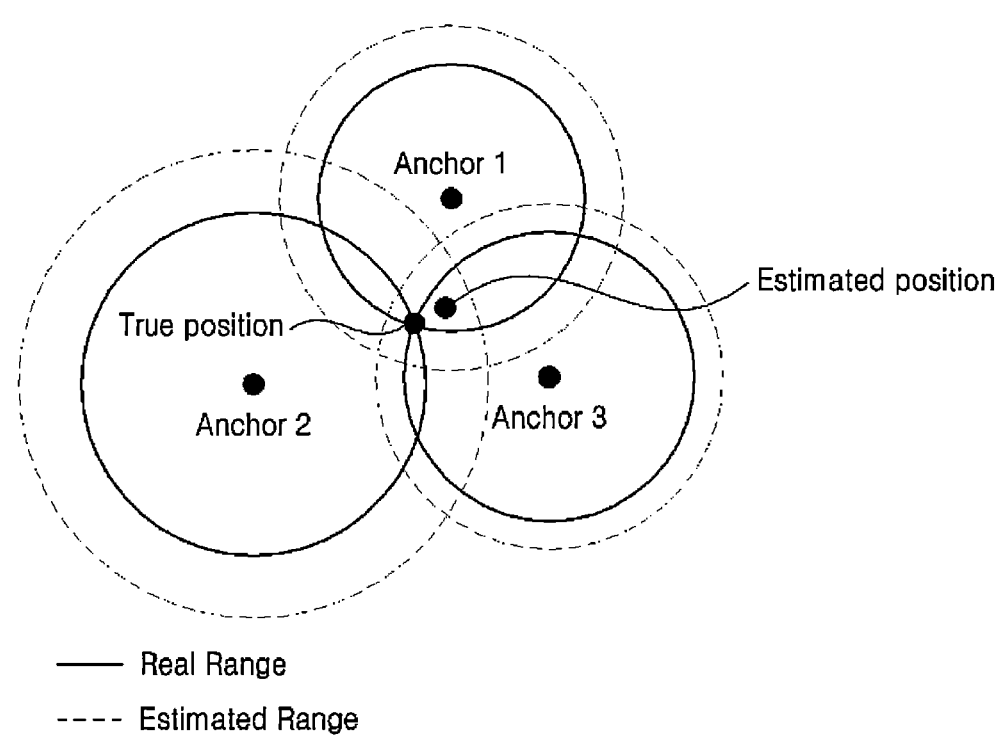
FIG. 4 is a diagram illustrating a method of estimating a position of an object by applying a trilateration technique to three anchors according to an embodiment of the present disclosure.

FIG. 4 is a diagram illustrating a method of estimating the position of the object by applying the trilateration technique to three anchors according to an embodiment of the present disclosure. The trilateration technique corresponds to a method of obtaining a relative position of an object using triangular geometry. In the trilateration technique, the position of the object can be acquired by using distances between three reference points and the object. Three circles having the distance between each reference point and the object as a radius are formed. A point at which all three circles overlap corresponds to the position of the object.

Referring to FIG. 4, a circle having a distance between anchor 1 and the object as a radius, a circle having a distance between anchor 2 and the object as a radius, and a circle having a distance between anchor 3 and the object as a radius may be formed. A point at which all the three circles overlap may correspond to a true position of the object. Further, a circle having an estimated distance between anchor 1 and the object as a radius, a circle having an estimated distance between anchor 2 and the object as a radius, and a circle having an estimated distance between anchor 3 and the object as a radius may be formed. A center position of a portion in which all the three circles overlap may correspond to an estimated position of the object.

Figure 5:
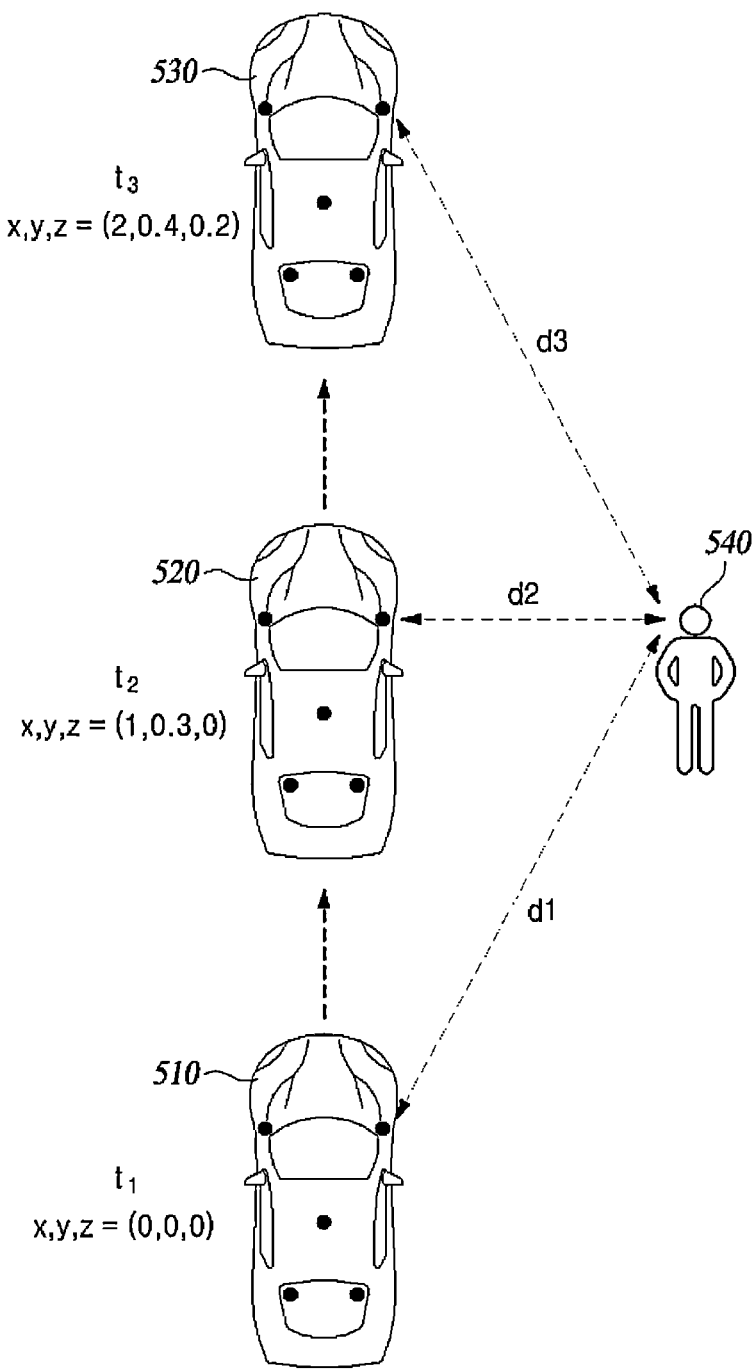
FIG. 5 is a diagram illustrating a distance between a position of a vehicle and a tag over time according to an embodiment of the present disclosure.

FIG. 5 is a diagram illustrating a distance between a position of a vehicle and a tag over time according to an embodiment of the present disclosure.

Referring to FIG. 5, a vehicle at a point in time $t_1$ (a "vehicle 510") may have five anchors mounted therein. Among the five anchors, one anchor on the right side of the front of the vehicle can be selected. Coordinates of the one selected anchor may correspond to (0, 0, 0). The one selected anchor may form a UWB link to a tag 540. An estimated distance d1 between the coordinates (0, 0, 0), which are the coordinates of one selected anchor, and the tag 540 may be calculated.

Coordinates of one anchor selected in the vehicle at a point in time $t_2$ (the "vehicle 520") may correspond to (1, 0.3, 0). (1, 0.3, 0), which are the coordinates of the one selected anchor, may be acquired using a value of a movement distance of the vehicle for a time $t_2-t_1$. The value of the movement distance of the vehicle for time $t_2-t_1$ can be calculated by using odometry, the number of vehicle wheel rotations, a camera deep learning model, dead reckoning, a vehicle speed and direction, or the like. The one selected anchor may form a UWB link to the tag 540. An estimated distance d2 between (1, 0.3, 0), which are the coordinates of the one selected anchor, and the tag 540 may be calculated.

Coordinates of one anchor selected in the vehicle at a point in time $t_3$ (the "vehicle 530") may correspond to (2, 0.4, 0.2). (2, 0.4, 0.2), which are the coordinates of the one selected anchor, may be acquired by using a value of a movement distance of the vehicle for time $t_3-t_2$. The value of the movement distance of the vehicle for the time $t_3-t_2$ may be calculated by using the odometry, the number of vehicle wheel rotations, the camera deep learning model, the dead reckoning, the speed and direction of the vehicle, or the like. The one selected anchor may form a UWB link to the tag 540. An estimated distance d3 between (2, 0.4, 0.2), which are the coordinates of the one selected anchor, and the tag 540 may be calculated.

Figure 6:
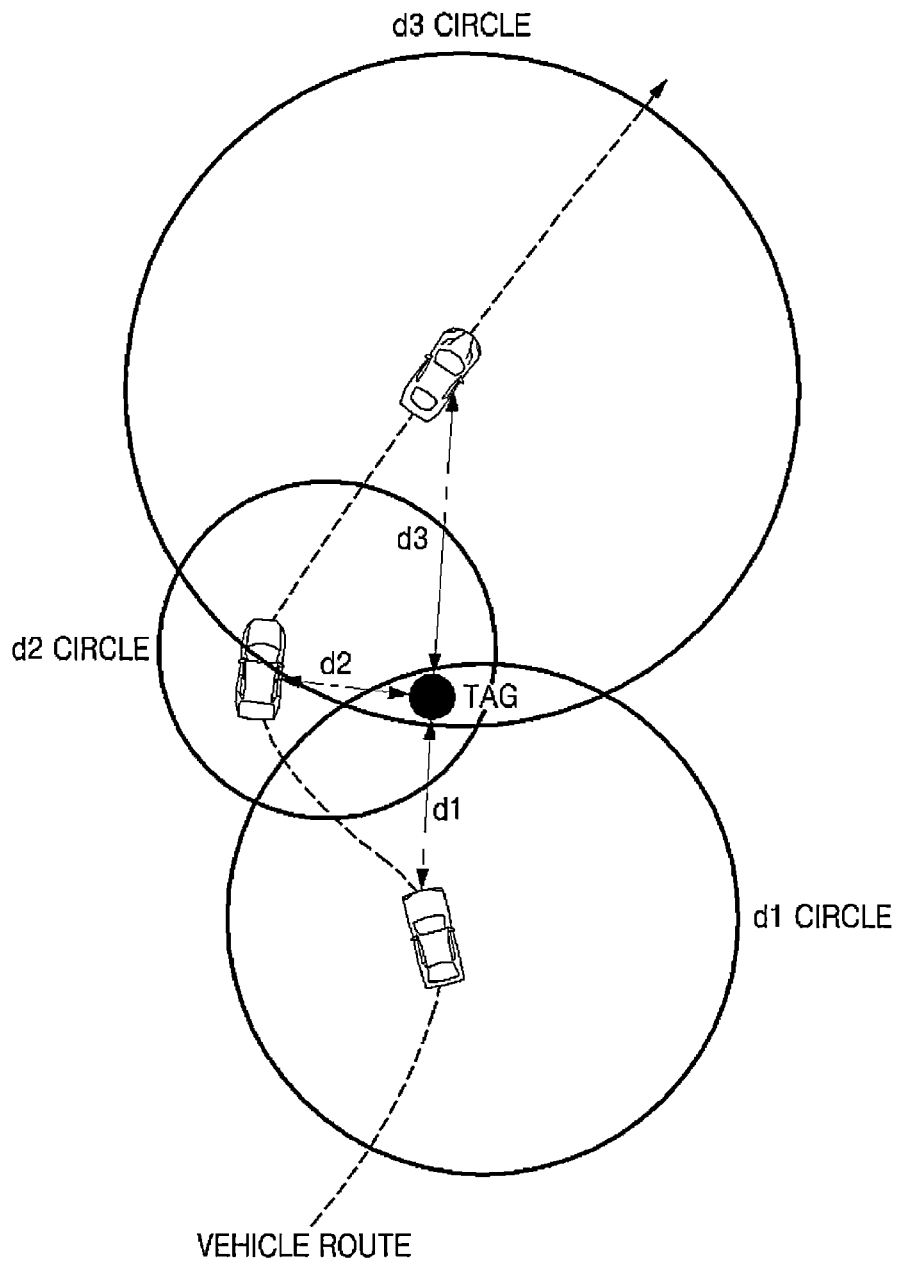
FIG. 6 is a diagram illustrating a process of estimating a position of a tag using the position of the vehicle over time according to an embodiment of the present disclosure.

FIG. 6 is a diagram illustrating a process of estimating a position of the tag using a position of the vehicle over time according to an embodiment of the present disclosure.

Referring to FIG. 6, a vehicle route may correspond to a route along which the vehicle moves for time $t_3-t_1$ in FIG. 5. The vehicle route may correspond to a movement route of the one anchor selected from among the five anchors mounted on the vehicle in FIG. 5. Three coordinates on the movement route of the vehicle can be selected. The three coordinates can be used in the trilateration technique. The three coordinates may be selected using a vehicle speed, a direction, and an angle of the vehicle, an absolute position at a point in time $t_1$, odometry, the number of vehicle wheel rotations, a camera deep learning model, and the like. Estimated distances between the respective coordinates and the tag may correspond to d1, d2, and d3. A d1 circle, a d2 circle, and a d3 circle may be generated with d1, d2, and d3 as radii. A center position of a portion in which the d1 circle, the d2 circle, and the d3 circle overlap may be estimated as the position of the tag. Each coordinate on the movement route of the vehicle may be stored in a memory of the vehicle. An estimated distance between each coordinate and the tag may also be stored in the memory of the vehicle. An algorithm for estimating the position of the tag through this process may correspond to a smart anchor-based position estimation (SAP; Smart Anchor Positioning) algorithm.

The number of tags that can be recognized by performing the trilateration technique using one anchor mounted on the vehicle may be larger than the number of tags that can be recognized by performing the trilateration technique using three anchors mounted on the vehicle. When the trilateration technique is performed using one anchor mounted on a vehicle, an object detection rate and a link formation rate can be improved.

Figure 7A:
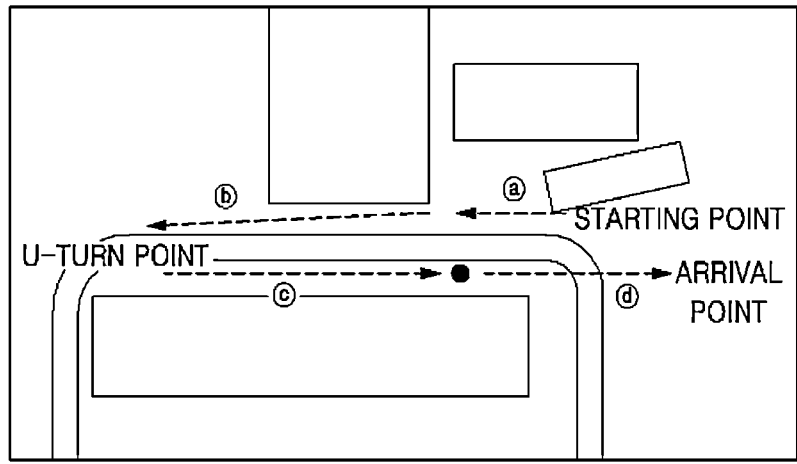
FIGS. 7A and 7B are diagrams illustrating positions of tags and anchors when a vehicle having a plurality of anchors mounted therein moves according to an embodiment of the present disclosure.
Figure 7B:
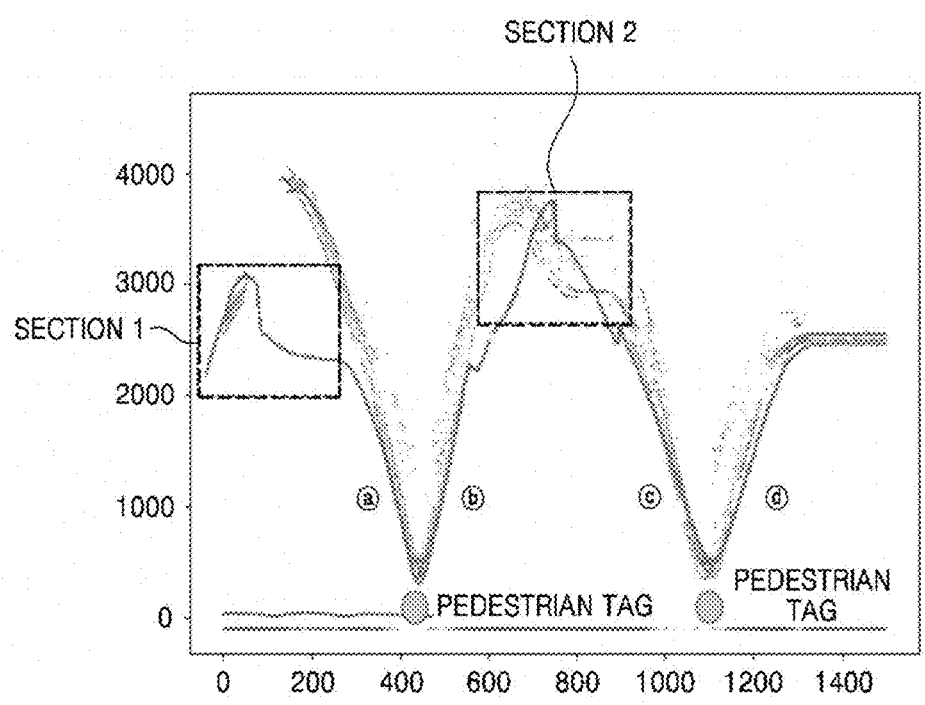

FIGS. 7A and 7B are diagrams illustrating positions of tags and anchors when a vehicle having a plurality of anchors mounted therein moves according to an embodiment of the present disclosure.

Referring to FIG. 7A, the vehicle having the five anchors mounted therein on a map may pass a point a, a tag, and a point b from a starting point, make a U-turn, pass a point c, a tag, and a point d, and move to an arrival point. Positions of the five anchors may be changed according to the movement route of the vehicle.

Referring to FIG. 7B, as the vehicle moves in FIG. 7A, the positions of five anchors mounted on the vehicle may be expressed in coordinates. Section 1 may be unstable because absolute position coordinates of the anchor are not initially set. As the vehicle passes a point a and approaches a pedestrian tag, the position of the anchor may also approach the pedestrian tag. The vehicle may pass a point b and enter section 2. Section 2 may be unstable as the vehicle makes a U-turn. The vehicle may pass section 2, pass a point c, and approach a pedestrian tag. Accordingly, the position of the anchor may also approach the pedestrian tag. As the vehicle passes a point d and stops, the position of the anchor may also not change.

Figure 8:
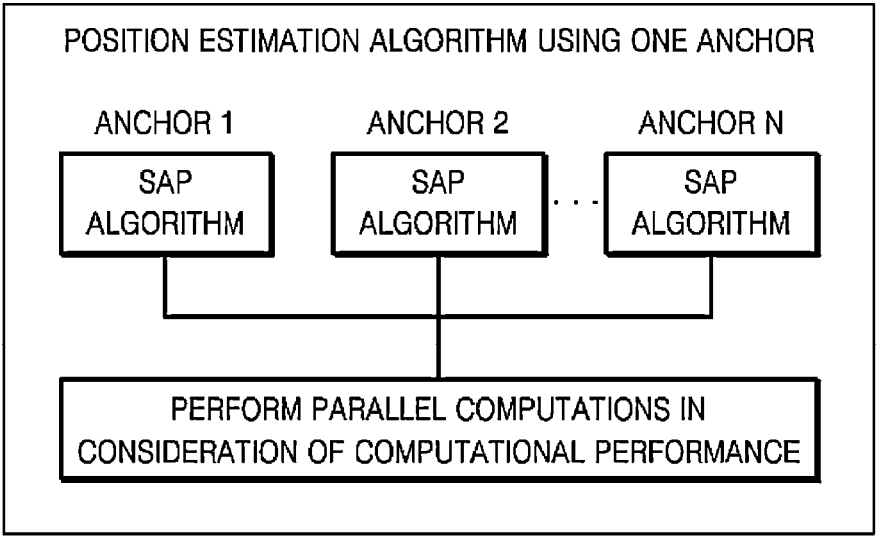
FIG. 8 is a diagram illustrating a method of applying a smart anchor-based position estimation algorithm to each of a plurality of anchors according to an embodiment of the present disclosure.

FIG. 8 is a diagram illustrating a method of applying a smart anchor-based position estimation algorithm to each of a plurality of anchors according to an embodiment of the present disclosure.

Referring to FIG. 8, an n number of anchors may be mounted on the vehicle. The smart anchor-based position estimation algorithm may be performed using each of the n anchors. The smart anchor-based position estimation algorithms using each of the n anchors can be performed in parallel in consideration of computational performance. An optimal anchor having a highest link formation rate and accuracy of the position may be selected using an error minimization objective function. The position of the object estimated by applying the trilateration technique to this optimal anchor can be finally used.

Figure 9:
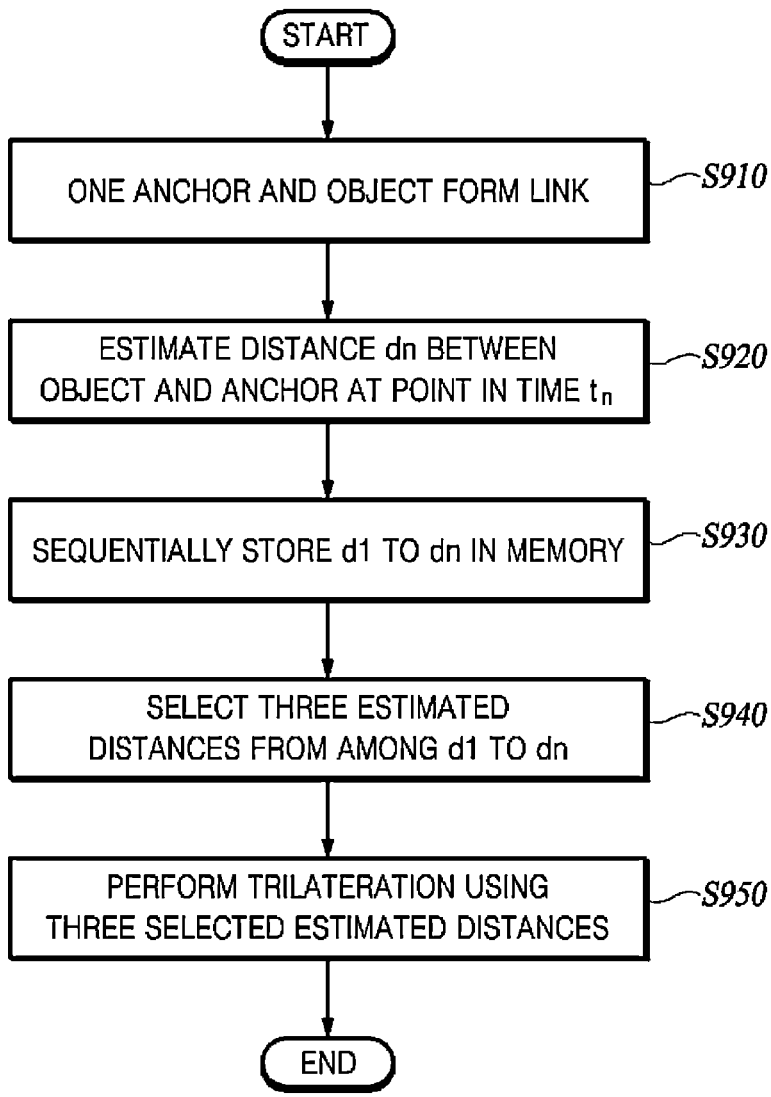
FIG. 9 is a diagram illustrating a process of estimating a position of a smart anchor-based object according to an embodiment of the present disclosure.

FIG. 9 is a diagram illustrating a process of estimating the position of the object using a smart anchor-based algorithm according to an embodiment of the present disclosure.

Referring to FIG. 9, one or more anchors may be mounted on a vehicle. One anchor and an object may form a link (S910). A distance dn between the object and the anchor at a point in time $t_n$ may be estimated (S920). The distance dn between the object and the anchor may be estimated using coordinates of the anchor and coordinates of the tag at each point in time. The coordinates of the anchor at each point in time may be calculated using a movement distance of the vehicle per hour. The movement distance of the vehicle per hour may be calculated using a camera deep learning model, a speed of the vehicle, a wheel speed, odometry, dead reckoning, or the like. The estimated distances d1 to dn between the object and the anchor may be sequentially stored in the memory (S930). The coordinates of the anchor at each point in time may also be stored in the memory. Three estimated distances may be selected from among d1 to dn (S940). Three coordinates may be selected from a movement route of the vehicle. Trilateration may be performed using the three estimated distances and the three coordinates that have been selected (S950). Three circles with the three estimated distances as radii may be formed. A center position of a portion in which the three circles overlap may be estimated as the position of the object.

Figure 10:
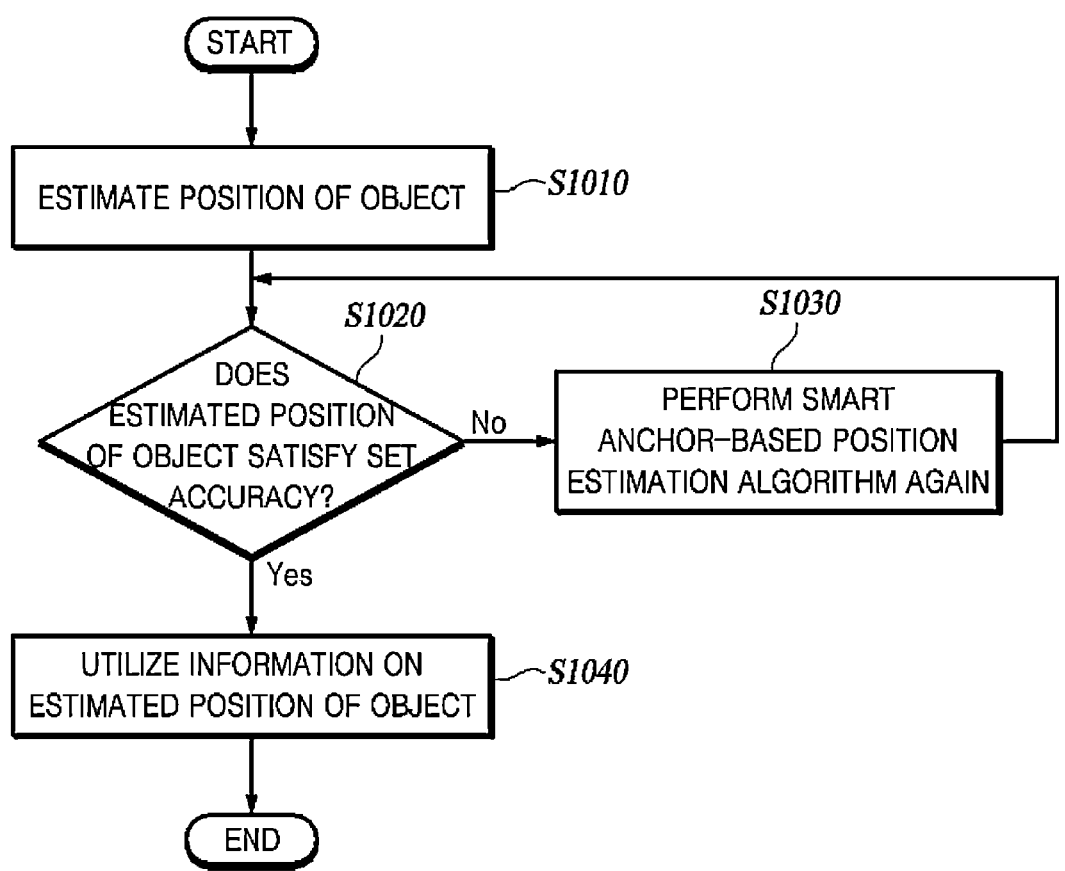
FIG. 10 is a diagram illustrating a process of utilizing an estimated position of an object according to the accuracy of the estimated position of the object according to an embodiment of the present disclosure.

FIG. 10 is a diagram illustrating a process of utilizing the estimated position of the object according to the accuracy of the estimated position of the object according to an embodiment of the present disclosure.

Referring to FIG. 10, the position of the object may be estimated using the smart anchor-based algorithm of FIG. 8 (S1010). A determination may be made as to whether the estimated position of the object satisfies set accuracy (S1020). The set accuracy may correspond to an arbitrary value. The estimated position of the object may be compared with a true position of the object. When the set accuracy is not satisfied (S1020—NO), the smart anchor-based position estimation algorithm may be performed again (S1030). Alternatively, a determination may be made as to whether a position of the object estimated by performing a smart anchor-based position estimation algorithm using another anchor satisfies the set accuracy. A determination may be made as to whether the position of the object estimated by performing the smart anchor-based position estimation algorithm again satisfies the set accuracy. When the set accuracy is satisfied (S1020—YES), information on the estimated position of the object may be utilized (S1040). The information on the estimated position of the object may be used as input data of various applications.

Figure 11:
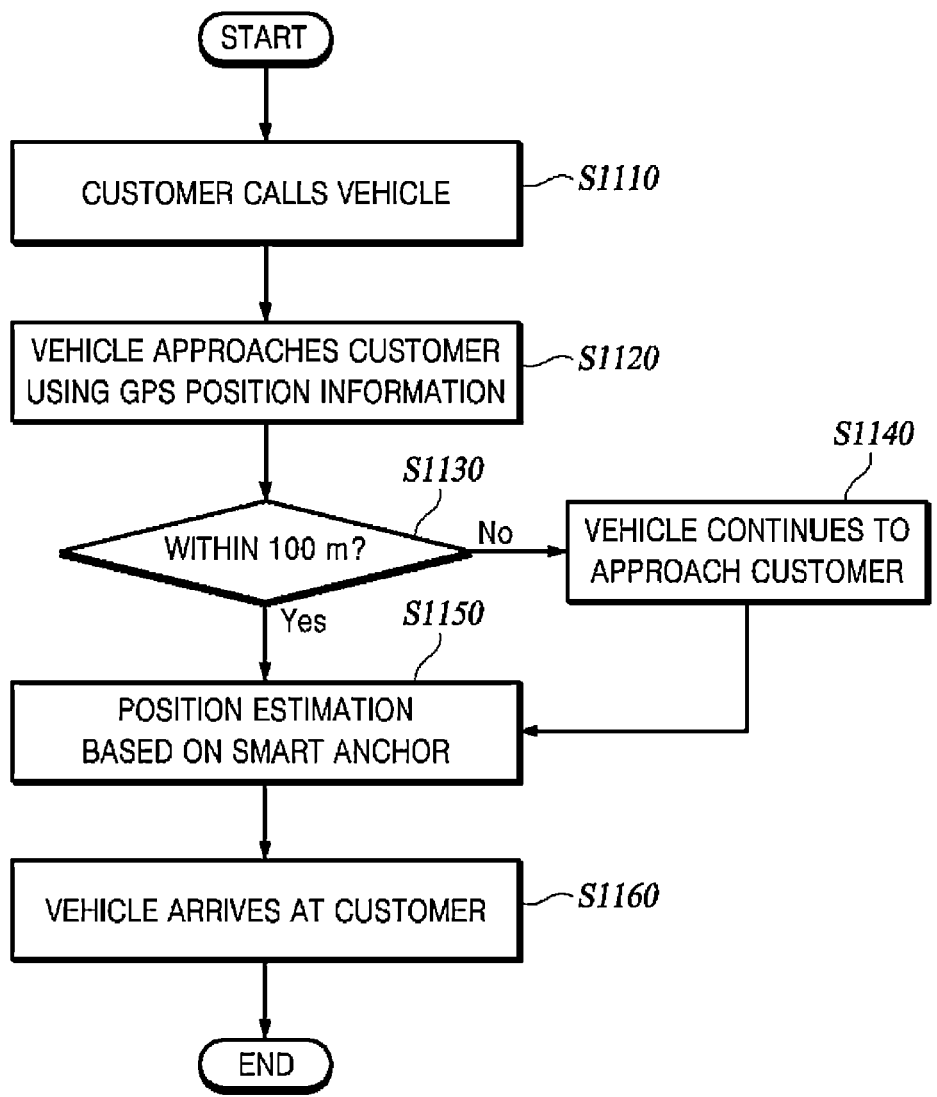
FIG. 11 is a diagram illustrating a process of providing a mobility service using a global positioning system (GPS) and an Ultra WideBand (UWB) according to an embodiment of the present disclosure.

FIG. 11 is a diagram illustrating a process of providing a mobility service using a GPS and a UWB according to an embodiment of the present disclosure. A path planning technology may refer to a technology for setting a traveling path of a mobility vehicle. Examples of the mobility vehicle may include a passenger vehicle, such as a car, a truck, or a sport utility vehicle, a drone, a bus, a subway, an electric kickboard, an aircraft, or the like. The mobility service refers to all services that support movement. Global path planning may mean optimizing a traveling path in a relatively large area. The mobility service may be referred to herein as a vehicle service, a shared mobility service, a shared vehicle service, or the like. Local path planning may mean optimizing a traveling path in real time using a sensor or the like on a path obtained as a result of the global path planning. When a vehicle moves to a customer using the global path planning and the local path planning using only a GPS, it may be difficult for the customer to find the vehicle due to GPS error.

In an urban area, a large GPS error may occur due to a multipath fading effect. When a vehicle travels to a customer in the urban area using the global path planning and the local path planning using only the GPS, it may be more difficult for the vehicle to find a position of the customer. For example, an error range of the GPS may correspond to 17 to 33 m. Even when 5G or LTE, which is wireless communication, is used, the error range may correspond to 50 to 100 m.

Referring to FIG. 11, a customer may call a vehicle (S1110). The customer can call the vehicle using an application on a smartphone. The vehicle may correspond to a robotaxi or a sharing car. The vehicle may correspond to an autonomous vehicle. The vehicle may request GPS position information from the customer. The vehicle may request the customer to agree to UWB link formation. The customer may transmit position information based on the GPS to the vehicle. The vehicle may approach the customer using the GPS position information (S1120).

A determination may be made as to whether or not a distance between the vehicle and the customer is within 100 m (S1130). When the distance between the vehicle and the customer is not within 100 m (S1130—NO), the vehicle may continue to approach the customer using the GPS position information (S1140). When the vehicle continues to approach the customer and the distance between the vehicle and the customer becomes within 100 m, the vehicle may perform a smart anchor-based position estimation. When the distance between the vehicle and the customer is within 100 m (S1130—YES), the vehicle may perform the smart anchor-based position estimation (S1150). The vehicle can form a UWB link with an IT device of the customer. The IT device may include a UWB sensor. The vehicle may request position-based security authentication from the customer. The customer may agree to the request for position-based security authentication. The vehicle may request precise position information from the customer. The customer may transmit the precise position information to the vehicle.

The vehicle may move to the customer using a result of the smart anchor-based position estimation and the precise position information transmitted by the customer. The vehicle may arrive at the customer (S1160). When the vehicle arrives at the customer, an alarm indicating that the vehicle has approached may be provided to the IT device of the customer. The customer may confirm that the vehicle has arrived and then request termination. The vehicle may also be provided with a termination alarm. The alarm may be provided through sound, vibration, vision, or the like.

When a digital key is mounted in the vehicle, no separate hardware needs to be installed to perform the above-described process. Even when the digital key is not mounted in the vehicle, the above-described process may be performed in a case in which a separate small terminal is installed in a conventional vehicle. The separate small terminal may correspond to an anchor module, an algorithm module, or a control module. Accordingly, a conventional vehicle other than the sharing car or the robotaxi can also perform the above process. The vehicle can continuously perform updates through Over The Air (OTA). The vehicle may provide a subscription service.

Figure 12:
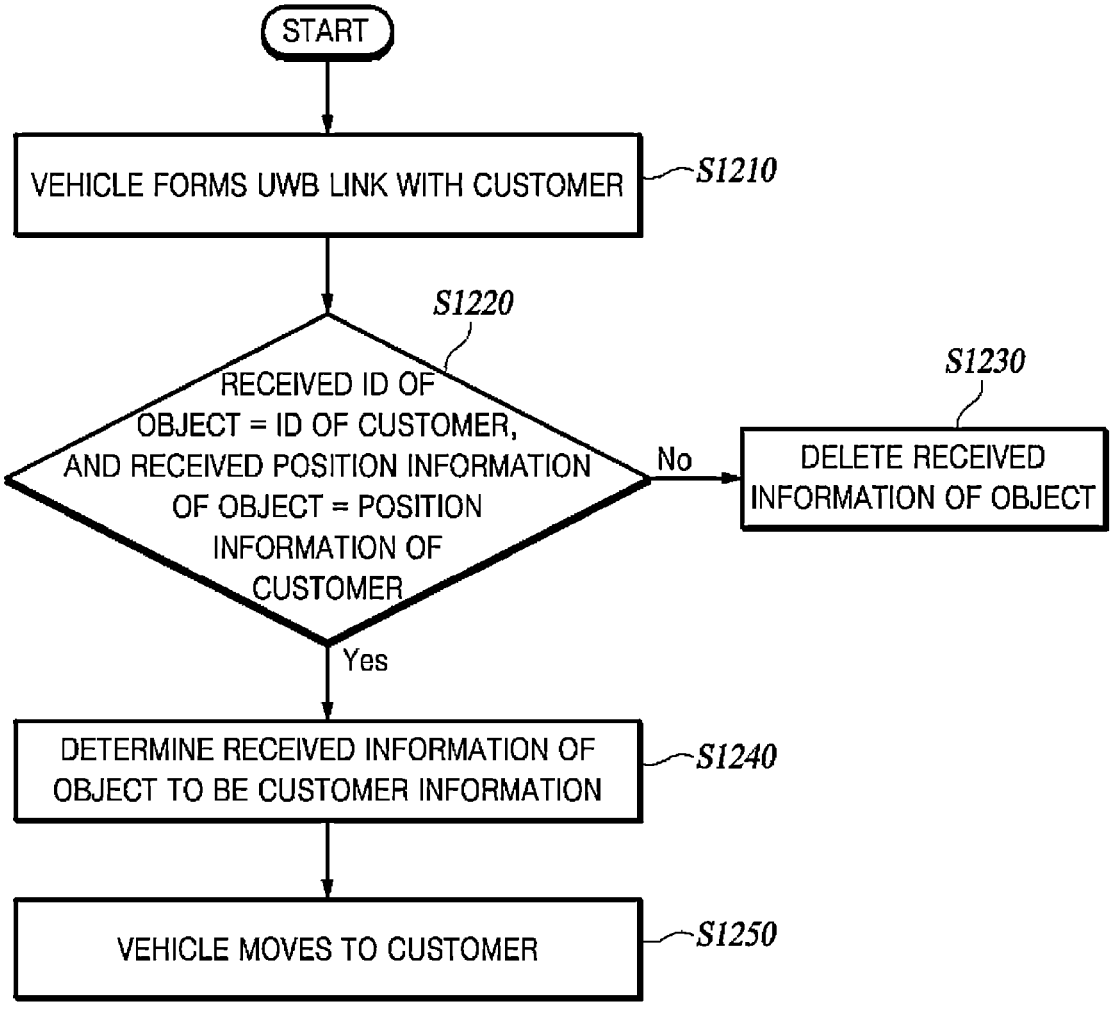
FIG. 12 is a diagram illustrating a process of performing position-based security authentication according to an embodiment of the present disclosure.

FIG. 12 is a diagram illustrating a process of performing position-based security authentication according to an embodiment of the present disclosure. The vehicle forms the UWB link with the customer, and then the vehicle can perform position-based security authentication. The customer and the vehicle may transmit or receive UWB pulse waves to or from each other. Time of flight (TOF) is a technology for measuring a distance to an object using a signal. A distance between the customer and the vehicle may be measured by the customer transmitting UWB pulse waves to the vehicle and measuring a time for the UWB pulse waves to return after the UWB pulse waves hit the vehicle. The position-based security authentication may be performed by using the ID of the customer and the position information of the customer. Information on another attacker other than the customer can be blocked through the position-based security authentication.

Referring to FIG. 12, the vehicle may form a UWB link with the customer (S1210). The vehicle may receive the ID of the customer and the position information of the customer from the customer. The vehicle may transmit or receive UWB pulse waves to or from the customer to calculate the distance to the customer. The vehicle may receive an ID of an object other than the customer and position information of the other object from the other object. The other object may correspond to a hacker. The hacker can attempt a spoofing attack on the vehicle. A head-up display (HUD) of the vehicle may display the received ID of the customer and the received position information of the customer. The HUD of the vehicle may display the received ID of the other object and the received position information of the other object. The HUD may provide such information with augmented reality (AR) or virtual reality (VR).

The vehicle may determine whether the received ID of the object is the same as the ID of the customer and whether the received position information of the object is the same as the position information of the customer (S1220). When the received ID of the object is the same as the ID of the customer but the received position information of the object differs from the position information of the customer, or when the received ID of the object differs from the ID of the customer but the received position information of the object is the same as the position information of the customer, or when the received ID of the object differs from the ID of the customer and the received position information of the object differs from the position information of the customer (S1220—NO), the vehicle may delete the received information of the object (S1230). The vehicle may determine the received information of the object to be hacker information. The HUD of the vehicle may display whether the received ID of the object is the same as the ID of the customer and whether the received position information of the object is the same as the position information of the customer.

When the received ID of the object is the same as the ID of the customer, and when the received position information of the object is the same as the position information of the customer (S1220—YES), the vehicle may determine the received information of the object to be the customer information (S1240). The object may be the same as the customer. The vehicle may move to the customer (S1250). When the vehicle arrives at the customer, the customer may board the vehicle. The customer can distinguish between the vehicle of which the service is requested and other vehicles using a human machine interface (HMI). The vehicle may use the HMI to distinguish between the customer requesting the service and other customers.

Figure 13:
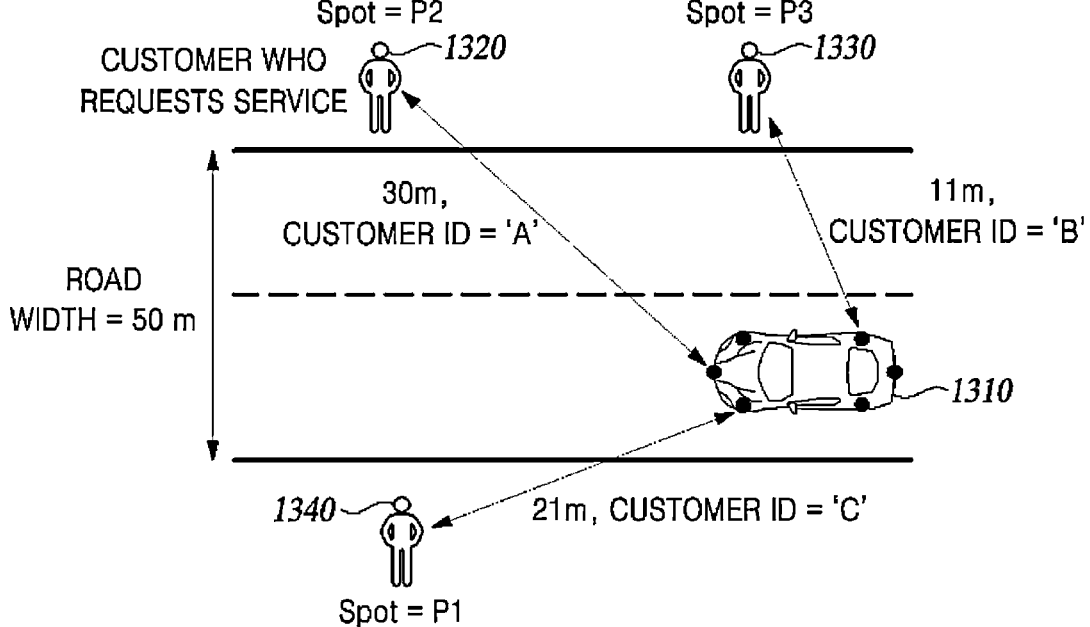
FIG. 13 is a diagram illustrating a method of finding a customer who requests a mobility service in an urban area or the like according to an embodiment of the present disclosure.

FIG. 13 is a diagram illustrating a method of finding a customer requesting a mobility service in an urban area or the like according to an embodiment of the present disclosure. In a multi-pass area such as an urban area, it may be difficult for the vehicle to find the customer who has requested the mobility service. In the urban area, many people can request the mobility service at the same time. The vehicle must find the person who has requested the mobility service among many people. Through the position-based security authentication, the vehicle can find the person who has requested the mobility service and move to the customer.

Referring to FIG. 13, a vehicle 1310 may provide the mobility service in an urban area. The vehicle 1310 may travel on a road with a road width of 50 m in the urban area. The vehicle 1310 may form a UWB link with a person 1320 at a location P2. The person 1320 at the location P2 is the customer who has requested the mobility service. The vehicle 1310 may receive A, which is the ID of the customer, and the position information of the customer from the person 1320 at the location P2. The vehicle 1310 may calculate the distance to the person 1320 at the location P2 through the UWB pulse waves. The vehicle 1310 may estimate the distance to the person 1320 at the location P2 using a smart anchor-based position estimation scheme. The vehicle 1310 may calculate or estimate that the distance to the person 1320 at the location P2 is 30 m. The vehicle 1310 may determine whether the received ID and the received position information are the same as A, which is the ID of the customer, and a distance of 30 m, which is the position information of the customer. Since the received ID is A and the received position information is the distance of 30 m, the received ID and the received position information are the same as A, which is the ID of the customer, and the distance of 30 m, which is the position information of the customer. The vehicle 1310 may determine that the person 1320 at the location P2 is the customer and move to the customer.

The vehicle 1310 may receive B, which is ID information, and position information from a person 1330 at a location P3. The vehicle 1310 may calculate a distance to the person 1330 at the location P3 through UWB pulse waves. The vehicle 1310 may estimate the distance to the person 1330 at the location P3 using the smart anchor-based position estimation scheme. The vehicle 1310 may calculate or estimate that the distance to the person 1330 at the location P3 is 11 m. The vehicle 1310 may determine whether the received ID and the received position information are the same as A, which is the ID of the customer, and a distance of 30 m, which is the position information of the customer. Since the received ID is B and the received position information is the distance of 11 m, the received ID and the received position information differ from A, which is the ID of the customer, and the distance of 30 m, which is position information of the customer. The vehicle 1310 may determine that the person 1330 at the location P3 is not the customer.

The vehicle 1310 may receive ID information C and position information from a person 1340 at a location P1. The vehicle 1310 may calculate a distance to the person 1340 at the location P1 through UWB pulse waves. The vehicle 1310 may estimate the distance to the person 1340 at the location P1 using the smart anchor-based position estimation scheme. The vehicle 1310 may calculate or estimate the distance to the person 1340 at the location P1 as 21 m. The vehicle 1310 may determine whether the received ID and the received position information are the same as A, which is the ID of the customer, and the distance of 30 m, which is the position information of the customer. Since the received ID is C and the received position information is the distance of 21 m, the received ID and received position information differ from A, which the ID of the customer, and the distance of 30 m, which is the position information of the customer. The vehicle 1310 may determine that the person 1340 at the location P1 is not the customer.

Figure 14:
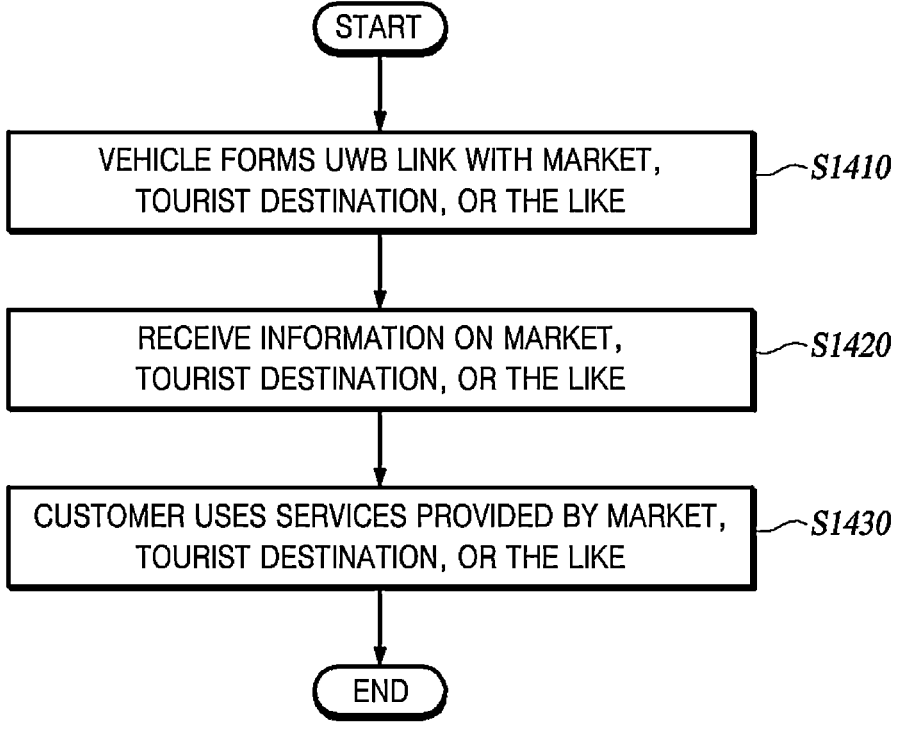
FIG. 14 is a diagram illustrating a process in which a customer receives information on a market or the like while using a mobility service according to an embodiment of the present disclosure.

FIG. 14 is a diagram illustrating a process in which a customer receives information on a market or the like while using a mobility service according to an embodiment of the present disclosure.

Referring to FIG. 14, a vehicle that a customer using a mobility service boards may form a UWB link with a market, a tourist destination, or the like (S1410). A UWB sensor may be installed at the market, the tourist destination, or the like. The UWB sensor installed at the market, the tourist destination, or the like can transmit UWB pulse waves to the vehicle. The market, the tourist destination, or the like may transmit information on the market, the tourist destination, or the like to the vehicle using an orthogonal frequency division multiplexing (OFDM) technology. The OFDM technology may correspond to a modulation technology for dividing one piece of information into several subcarriers, adding orthogonality to minimize intervals between the divided carriers, and performing multiplexing. The information on the market, the tourist destination, or the like may include latitude, longitude, business name, contact information, and product information of the market, the tourist destination, or the like. The market, the tourist destination, or the like may transmit distance information to the vehicle using TOF.

The vehicle may receive the information on the market, the tourist destination, or the like (S1420). The vehicle may perform a position-based security authentication procedure with the market, the tourist destination, or the like. The vehicle may accurately update position information of the vehicle using absolute position information of the market, the tourist destination, or the like. The customer boarding the vehicle may use services that are provided by the market, the tourist destination, or the like (S1430). The HUD of the vehicle may display information on the market, the tourist destination, or the like. The customer may check the information on the market, the tourist destination, or the like and use the services that are provided by the market, the tourist destination, or the like. The market, the tourist destination, or the like may include a UWB sensor to provide various types of information to vehicles that are traveling nearby. This makes it possible for the market, the tourist destination, or the like to perform marketing campaign.

Figure 15:
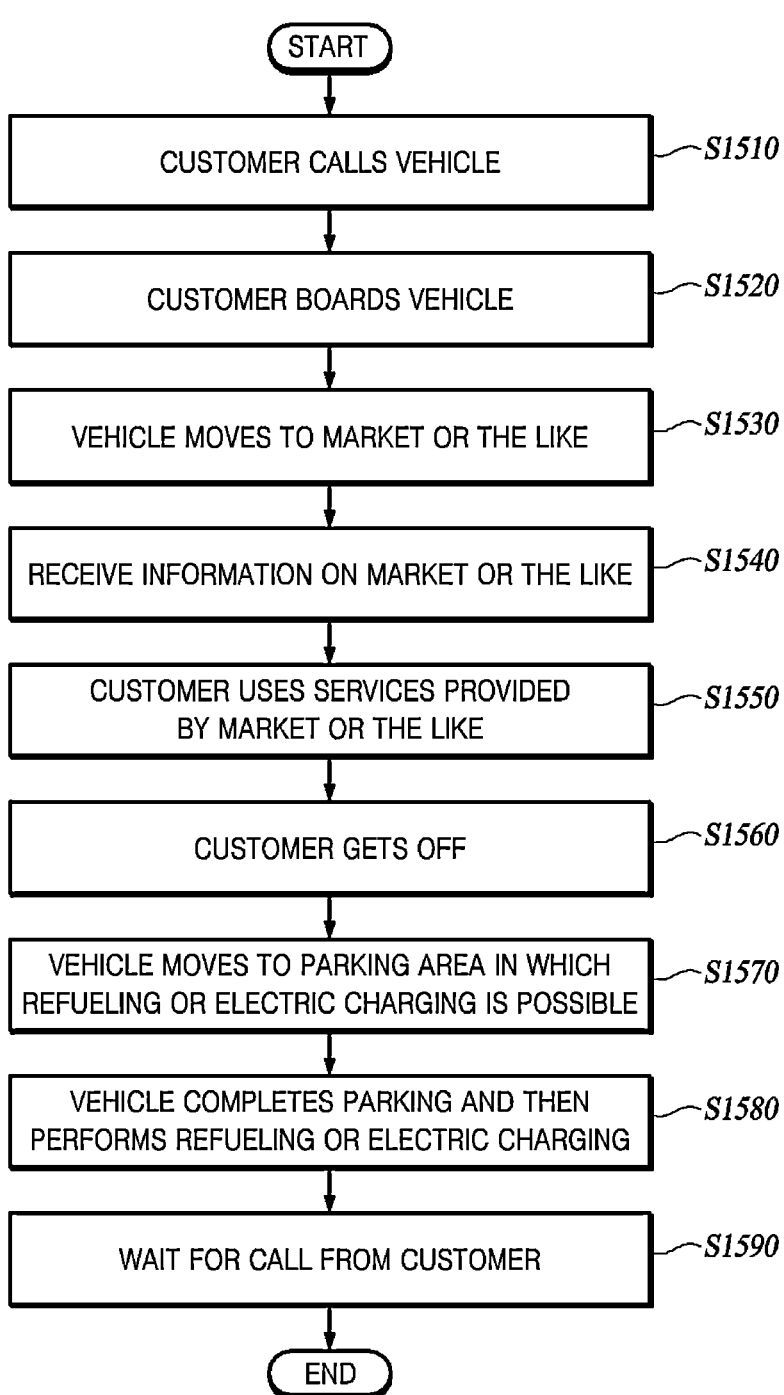
FIG. 15 is a diagram illustrating an overall process in which a vehicle provides a shared mobility service according to an embodiment of the present disclosure.

FIG. 15 is a diagram illustrating an overall process in which the vehicle provides a shared mobility service according to an embodiment of the present disclosure.

Referring to FIG. 15, the customer may call a vehicle to use the mobility service (S1510). The customer may search for a shared kickboard (scooter) near the customer to call the vehicle and use the shared kickboard to move to a main road. The vehicle may approach within 100 m of the customer using GPS information. When the vehicle approaches within 100 m of the customer, the vehicle and the customer can form a UWB link. The vehicle may receive an ID and position information from the customer. The vehicle may perform a position-based security authentication procedure with the customer. After the position-based security authentication is completed, the customer can board the vehicle (S1520). The vehicle can move to a destination set by the customer. The vehicle may move to a market or the like (S1530). The destination set by the customer may correspond to a market or the like.

When the vehicle is close to the market or the like, the vehicle may form a UWB link with the market or the like. The market or the like includes a UWB sensor mounted therein. The vehicle may receive information on the market or the like (S1540). The market may transmit information on the market to the vehicle. The information on the market may include position information and product information. The vehicle may request the absolute position information from the market. The vehicle may receive the absolute position information of the market and update its own position information using the absolute position information. The absolute position information of the market may include a longitude, latitude, and the like. The product information transmitted by the market may include, for example, product sales, product advertisement, or product discount information. The customer may use services that are provided by a market or the like (S1550). For example, the customer on board the vehicle may check an advertisement for discounted drink that is provided by the market through the HUD of the vehicle. The customer may click a Buy button in the HUD of the vehicle to purchase the discounted drink. The vehicle may move to the market. The customer may search for a parking area around the market and park the vehicle in the parking area. The customer may get off at the market and pick up the purchased discounted drink. The customer may pick up the discounted drink purchased at the market and board the vehicle again. The customer may set another destination.

The vehicle may move to the other destination set by the customer. When the vehicle arrives at the other destination, the customer may get off the vehicle (S1560). After the customer gets off, the vehicle may need refueling or electric charging for additional traveling. The vehicle may search for an area in which the refueling or electric charging is available. The vehicle may move to a parking area in which the refueling or electric charging is possible (S1570). The vehicle may move to the parking area using the global path planning and the local path planning. The parking area has a UWB sensor mounted therein. The vehicle may form a UWB link with the parking area. The parking area may transmit UWB pulse waves to the vehicle. The parking area may transmit position information and an ID to the vehicle. The vehicle and the parking area can perform a position-based security authentication procedure. The vehicle may complete parking in the parking area and then perform the refueling or electric charging (S1580). The parking may be performed using an automatic valet parking mode. The vehicle may wait for a call from the customer after completing the refueling or electric charging (S1590).

Figure 16:
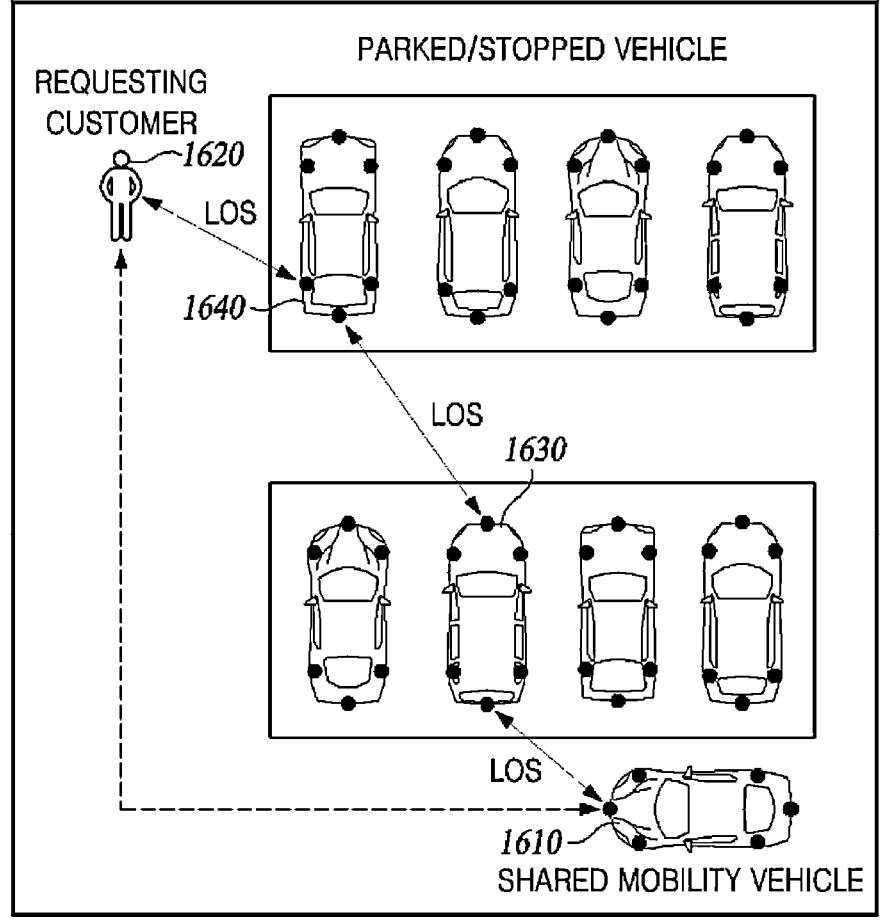
FIG. 16 is a diagram illustrating a method of estimating a position of a customer in an area in which GPS reception is unavailable according to an embodiment of the present disclosure.

FIG. 16 is a diagram illustrating a method of estimating a position of a customer in an area in which GPS reception is unavailable according to an embodiment of the present disclosure. An underground parking lot or tunnel may correspond to an indoor area in which GPS reception is unavailable. In the area in which GPS reception is unavailable, a mobility service can be provided to customers using UWB. The fact that the two objects are in the LOS situation may mean that the two objects are in a visible distance. The fact that two objects are in the NLOS situation may mean that the two objects are in a non-visible distance.

Referring to FIG. 16, a customer 1620 may request a mobility service in the area in which GPS reception is unavailable, such as an underground parking lot. The shared mobility vehicle 1610 may receive the request and confirm that the area in which the customer is present is an area in which GPS reception is unavailable. The shared mobility vehicle 1610 may search for another vehicle 1630 capable of forming a UWB link in the underground parking lot. When the shared mobility vehicle 1610 finds the other vehicle 1630 capable of forming a UWB link, the shared mobility vehicle 1610 may transmit a position-based security authentication message to the other vehicle 1630 to form a secure UWB link. The position-based security authentication message may include, for example, a vehicle ID, a vehicle position, a vehicle state, or vehicle power information. Here, the shared mobility vehicle 1610 and the other vehicle 1630 may be in a LOS situation.

The shared mobility vehicle 1610 may request a UWB anchor of the other vehicle 1630 to operate. The shared mobility vehicle 1610 may transmit a UWB link establishment message to the other vehicle 1630. The other vehicle 1630 may accept the request to operate the UWB anchor and activate the UWB anchor. The other vehicle 1630 may attempt to form the UWB link. The UWB anchor of the other vehicle 1630 may receive power from an electronic control unit (ECU). The shared mobility vehicle 1610 may form a UWB link with the other vehicle 1630. The other vehicle 1630 may request and form a UWB link with a second other vehicle 1640 parked nearby. Here, the shared mobility vehicle 1610 and the second other vehicle 1640 may be in a NLOS situation. The other vehicle 1630 and the second other vehicle 1640 may be in a LOS situation.

The second other vehicle 1640 may form the UWB link with the customer 1620. The second other vehicle 1640 may estimate a position of the customer 1620. Here, the second other vehicle 1640 and the customer 1620 may be in a LOS situation. The shared mobility vehicle 1610 and the customer 1620 may be in a NLOS situation. The second other vehicle 1640 may transmit a result of estimating the position of the customer 1620 to the other vehicle 1630. The other vehicle 1630 may transmit the received result of estimating the position of the customer 1620 to the shared mobility vehicle 1610. The shared mobility vehicle 1610 may move to the customer 1620 using the received result of estimating the position of the customer 1620. The customer may agree to sharing the position information of the customer with the shared mobility vehicle 1610, the other vehicle 1630, and the second other vehicle 1640.

Figure 17:
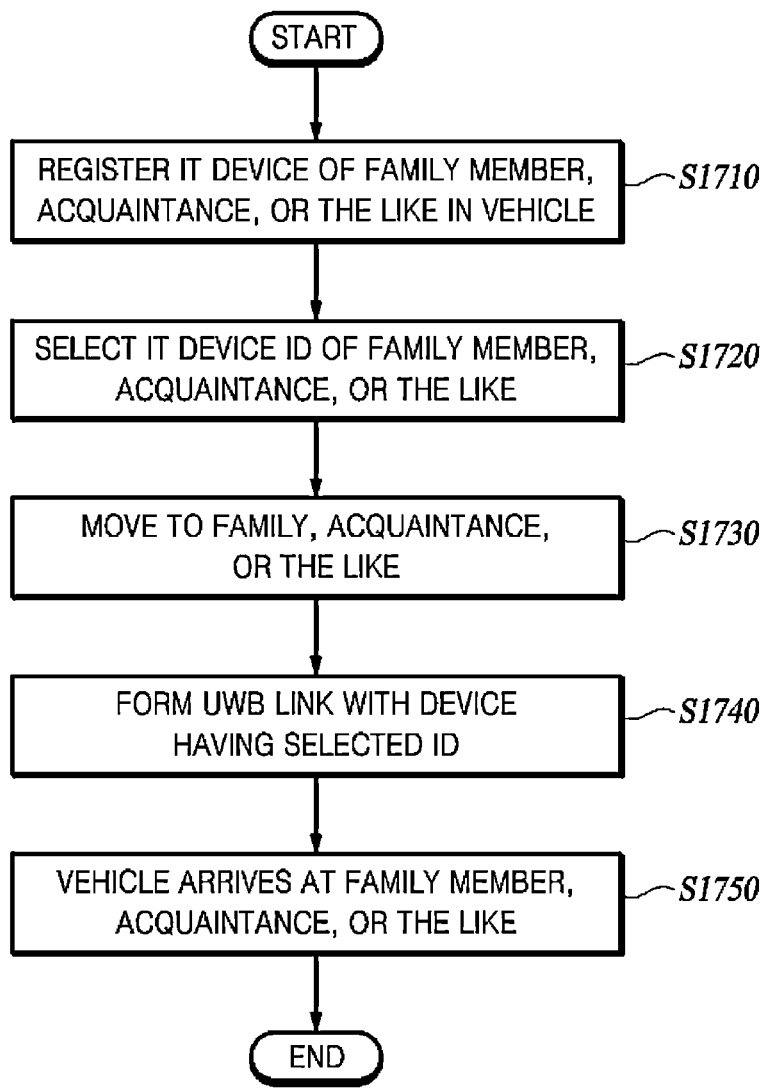
FIG. 17 is a diagram illustrating a process of estimating a position of a customer carrying an information technology (IT) device registered in a vehicle according to an embodiment of the present disclosure.

FIG. 17 is a diagram illustrating a process of estimating a position of a customer having an IT device registered in a vehicle according to an embodiment of the present disclosure.

Referring to FIG. 17, an IT device of a family member, an acquaintance, or the like may be registered in the vehicle (S1710). The vehicle may store the IT device in a memory. The IT device can be registered using a digital key system of the vehicle. When the vehicle starts traveling, the vehicle can perform conversion from a static domain to a dynamic domain. An IT device ID of the family member, the acquaintance, or the like may be selected from the memory (S1720). The vehicle can move to the family, acquaintance, or the like using the IT device ID (S1730). The family member, acquaintance, or the like carries the IT device. The IT device may transmit GPS information to the vehicle. The vehicle may move to the family member, the acquaintance, or the like carrying the IT device using the GPS information.

When the vehicle approaches the family member, the acquaintance, or the like who carries the IT device, the vehicle may form a UWB link with the IT device having the selected ID (S1740). The vehicle may receive position information from the IT device. The vehicle and the IT device can perform the position-based security authentication procedure. The vehicle can estimate a position of the IT device using the smart anchor-based position estimation scheme based on a smart anchor. The vehicle may arrive at the family member, the acquaintance, or the like using the received position information (S1750). When the vehicle approaches the family member, the acquaintance, or the like, the IT device carried by the family member, the acquaintance, or the like may provide an alarm. The alarm may also be provided to the vehicle.

Figure 18:
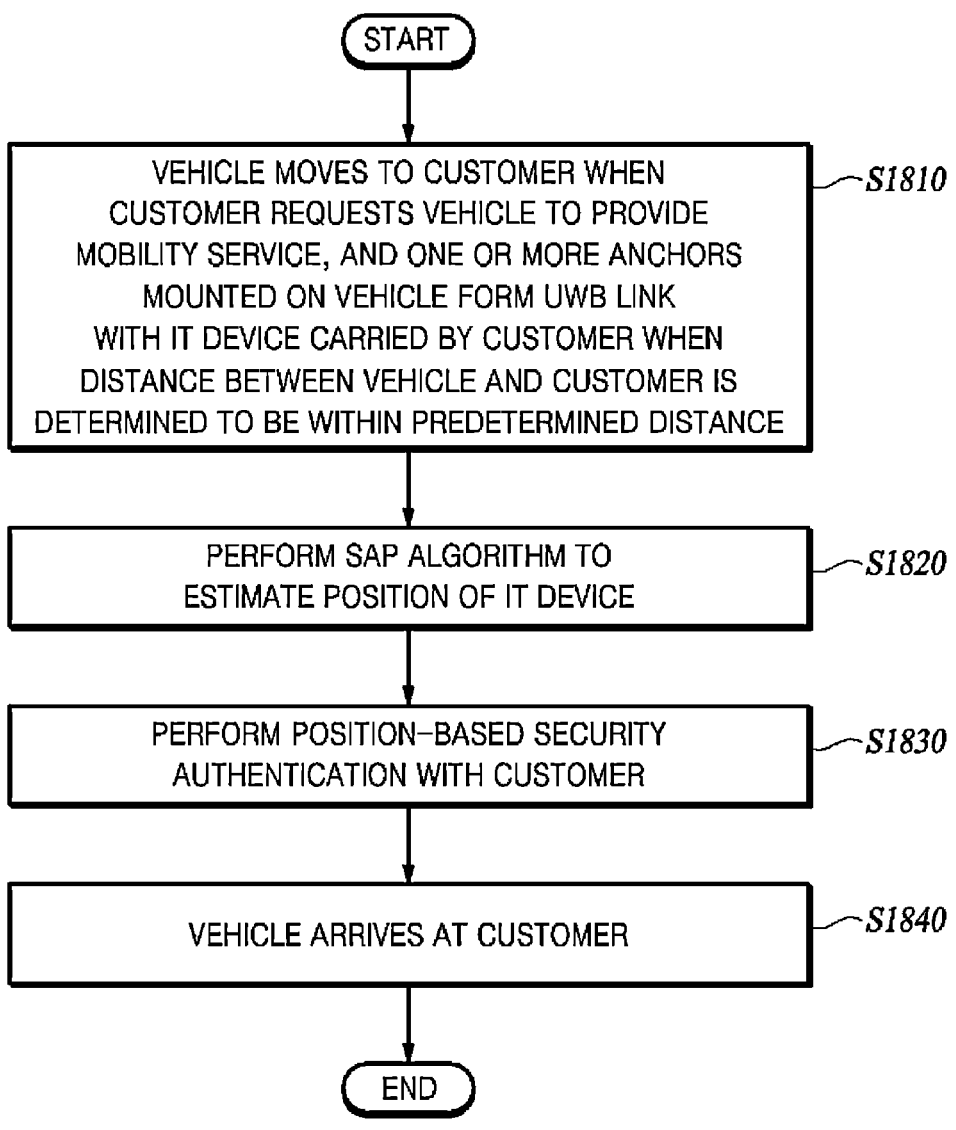
FIG. 18 is a diagram illustrating a method of providing a mobility service according to an embodiment of the present disclosure.

FIG. 18 is a diagram illustrating a method of providing a mobility service according to an embodiment of the present disclosure.

Referring to FIG. 18, the vehicle may move toward the customer when the customer requests the vehicle to provide a mobility service, and one or more anchors mounted on the vehicle may form a UWB link with the IT device carried by the customer when a distance between the vehicle and the customer is determined to be within a predetermined distance (S1810). The mobility service providing apparatus may perform an SAP algorithm to estimate a position of the IT device (S1820). The SAP algorithm may correspond to an algorithm for identifying one or more LOS anchors among one or more anchors mounted on the vehicle, selecting a reference anchor from among the one or more LOS anchors, selecting three coordinates from a movement path of the vehicle when the number of reference anchors is one, and estimating the position of the IT device using the three coordinates and the estimated distance between the reference anchor and the IT device. When the IT device is registered in the vehicle, the vehicle may move towards the customer using the ID of the IT device.

The step of estimating the position of the IT device in the area in which GPS reception is unavailable may include a step of searching for another vehicle present around the vehicle or a step of requesting one or more anchors mounted on the other vehicle to operate. The step of estimating the position of the IT device in the area in which GPS reception is unavailable may also include a step of forming a UWB link with the one or more anchors mounted in the other vehicle. The step of estimating the position of the IT device in the area in which GPS reception is unavailable may also include a step of receiving an estimated position of the IT device present around the other vehicle from the other vehicle. The other vehicle may form the UWB link with the IT device, and the other vehicle may perform the SAP algorithm to estimate the position of the IT device.

The mobility service providing apparatus may perform position-based security authentication with the customer (S1830). A step of performing the position-based security authentication with the customer may include a step of determining whether a received ID of an object and received position information of the object are the same as the ID of the customer and the position information of the customer, respectively. The step of performing the position-based security authentication with the customer may also include a step of determining whether the object is the customer based on the result of the determination. The received ID of the object and the received position information of the object, and the ID of the customer and the position information of the customer may be displayed on the HUD of the vehicle.

The vehicle may arrive at the customer (S1840). When the vehicle arrives at the customer, the vehicle may provide an alarm. The IT device may provide an alarm to the customer. A step of forming, by the one or more anchors mounted on the vehicle, a UWB link with a UWB sensor installed at a service providing location when the vehicle moves near the service providing location may include a step of receiving at least one of position information of the service providing location or service information of the service providing location from the service providing location. The step of forming, by the one or more anchors mounted on the vehicle, the UWB link with the UWB sensor installed at the service providing location when the vehicle moves near the service providing location may also include a step of moving, by the vehicle, to the service providing location when the customer uses a service provided at the service providing location. At least one of the position information of the service providing location or the service information of the service providing location may be displayed on the HUD of the vehicle.

According to the present disclosure, it is possible to provide a method and an apparatus for providing a shared mobility service in an area in which GPS reception is unavailable.

Further, according to the present disclosure, it is possible to provide a method and an apparatus for performing position-based security authentication with a customer.

Further, according to the present disclosure, it is possible to provide a method and an apparatus for improving a link formation rate using one anchor.

Further, according to the present disclosure, it is possible to provide a method and an apparatus for accurately estimating a position of a customer.

Further, according to the present disclosure, it is possible to provide a method and an apparatus to enable a customer to receive a service provided at a market or the like.

Further, according to the present disclosure, it is possible to provide a method and an apparatus for estimating a position of a customer carrying an IT device registered in a vehicle using the IT device.

Effects that can be obtained in the present disclosure are not limited to the above-described effects, and other effects not described can be clearly understood by those having ordinary skill in the art to which the present disclosure belongs from the following description.

The respective components of the device or the method according to the present disclosure may be implemented by hardware or software or may be implemented by a combination of the hardware and the software. Further, a function of each component may be implemented by software and a microprocessor may be implemented to execute the function of the software corresponding to each component.

Various implementation examples of the systems and techniques described herein may be realized by a digital electronic circuit, an integrated circuit, an FPGA (field programmable gate array), an ASIC (application specific integrated circuit), computer hardware, firmware, software, and/or a combination thereof. These various implementation examples may be implemented by one or more computer programs executable on a programmable system. The programmable system includes at least one programmable processor (which may be a special purpose processor or may be a general purpose processor) connected to receive data and instructions from a storage system, at least one input device, and at least one output device and transfer data and instructions to these. The computer programs (also known as programs, software, software applications, or code) include instructions for the programmable processor and are stored in a "computer-readable recording medium".

The computer-readable recording medium includes any type of recording devices in which data that can be read by a computer system is stored. The computer-readable recording medium may be a non-volatile or non-transitory medium, such as a ROM, a CD-ROM, a magnetic tape, a floppy disk, a memory card, a hard disk, a magneto-optical disc, and a storage device. The computer-readable recording medium may further include a transitory medium such as a data transmission medium. Further, the computer-readable recording medium may be distributed in network-connected computer systems, and computer-readable code may be stored and executed in a distributed manner.

Although a case in which respective processes are sequentially executed in the flowchart and timing diagram in the present specification has been described, this is merely illustrative of the technical spirit of the embodiment of the present disclosure. In other words, since various changes and modifications can be made by those having ordinary skill in the art to which the embodiment of the present disclosure pertains by executing the respective processes in order other than those described in the flowchart and timing diagram or executing one or more of the respective processes in parallel without departing from essential characteristics of the embodiment of the present disclosure, the flowchart and timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill should understand that the scope of the present disclosure is not to be limited by the above explicitly described embodiments but by the claims and equivalents thereof.

What is claimed is:

1. A mobility service providing method performed by a mobility service providing apparatus, the mobility service providing method comprising:

moving, by a vehicle, to a customer when the customer requests the vehicle to provide a mobility service and forming, by one or more anchors mounted on the vehicle, an Ultra WideBand (UWB) link with an information technology (IT) device carried by the customer when a determination is made that a distance between the vehicle and the customer is within a predetermined distance;

performing a smart anchor positioning (SAP) algorithm to estimate a position of the IT device;

performing position-based security authentication with the customer; and arriving, by the vehicle, at the customer, wherein the one or more anchors and the IT device transmit or receive UWB pulse waves, and wherein the SAP algorithm is an algorithm for identifying one or more line-of-sight (LOS) anchors among one or more anchors mounted on the vehicle, selecting one or more reference anchors from among the one or more LOS anchors, selecting three coordinates from a movement path of the vehicle when one reference anchor is selected, and estimating the position of the IT device using the three coordinates and three estimated distances between the reference anchor and the IT device at the three coordinates.

2. The mobility service providing method of claim 1, further comprising:

providing, by the vehicle, an alarm when the vehicle arrives at the customer, wherein the IT device provides an alarm to the customer.

3. The mobility service providing method of claim 1, wherein the performing of the position-based security authentication with the customer includes:

determining whether a received identifier (ID) of an object and a received position information of the object are the same as an ID of the customer and a position information of the customer; and determining whether the object is the customer based on a result of the determination.

4. The mobility service providing method of claim 3, wherein the received ID of the object and the received position information of the object, and the ID of the customer and the position information of the customer are displayed on a head-up display (HUD) of the vehicle.

5. The mobility service providing method of claim 1, further comprising:

forming, by the one or more anchors mounted on the vehicle, a UWB link with a UWB sensor installed at a service providing location when the vehicle moves near the service providing location;

receiving at least one of position information of the service providing location or service information of the service providing location from the service providing location; and moving, by the vehicle, to the service providing location when the customer uses a service provided at the service providing location.

6. The mobility service providing method of claim 5, wherein at least one of the position information of the service providing location or the service information of the service providing location is displayed on an HUD of the vehicle.

7. The mobility service providing method of claim 1, wherein the estimating of the position of the IT device in an area in which global positioning system (GPS) reception is unavailable comprises:

searching for another vehicle present around the vehicle;

requesting one or more anchors mounted on the other vehicle to operate;

forming an UWB link with the one or more anchors mounted on the other vehicle; and receiving an estimated position of the IT device present around the other vehicle from the other vehicle.

8. The mobility service providing method of claim 7, wherein the other vehicle forms the UWB link with the IT device, and wherein the other vehicle performs the SAP algorithm to estimate the position of the IT device.

9. The mobility service providing method of claim 1, wherein when the IT device is registered in the vehicle, the vehicle moves toward the customer using an ID of the IT device.

10. A mobility service providing apparatus, including a memory and a plurality of processors, wherein at least one of the plurality of processors is configured to:

cause a vehicle to move to a customer when the customer requests the vehicle to provide a mobility service and cause one or more anchors mounted on the vehicle to form an Ultra WideBand (UWB) link with an information technology (IT) device carried by the customer when a determination is made that a distance between the vehicle and the customer is within a predetermined distance;

perform a smart anchor positioning (SAP) algorithm to estimate a position of the IT device; and perform position-based security authentication with the customer, wherein the vehicle arrives at the customer, wherein the one or more anchors and the IT device transmit or receive UWB pulse waves, and wherein the SAP algorithm is an algorithm for identifying one or more line-of-sight (LOS) anchors among the one or more anchors mounted on the vehicle, selecting a reference anchor from among the one or more LOS anchors, selecting three coordinates from a movement path of the vehicle when the number of reference anchors is one, and estimating the position of the IT device using the three coordinates and an estimated distance between the reference anchor and the IT device.

11. The mobility service providing apparatus of claim 10, wherein when the vehicle arrives at the customer, the at least one processor causes the vehicle to provide an alarm, and wherein the IT device provides the alarm to the customer.

12. The mobility service providing apparatus of claim 10, wherein the at least one processor determines whether a received identifier (ID) of an object and a received position information of the object are the same as an ID of the customer and a position information of the customer, and determines whether the object is the customer based on a result of the determination.

13. The mobility service providing apparatus of claim 12, wherein the received ID of the object and the received position information of the object and the ID of the customer and the position information of the customer are displayed on a head-up display (HUD) of the vehicle.

14. The mobility service providing apparatus of claim 10, wherein the at least one processor is further configured to:

cause the one or more anchors mounted on the vehicle to form the UWB link with a UWB sensor installed at a service providing location when the vehicle moves near the service providing location;

receive at least one of position information of the service providing location or service information of the service providing location from the service providing location; and cause the vehicle to move to the service providing location when the customer uses a service provided at the service providing location.

15. The mobility service providing apparatus of claim 14, wherein at least one of the position information of the service providing location or the service information of the service providing location is displayed on an HUD of the vehicle.

16. The mobility service providing apparatus of claim 10, wherein the at least one processor is further configured to:

search for another vehicle present around the vehicle in an area in which global positioning system (GPS) reception is unavailable;

request one or more anchors mounted on the other vehicle to operate;

form the UWB link with the one or more anchors mounted on the other vehicle; and receive an estimated position of the IT device present around the other vehicle from the other vehicle.

17. The mobility service providing apparatus of claim 16, wherein the other vehicle forms the UWB link with the IT device, and wherein the other vehicle performs the SAP algorithm to estimate the position of the IT device.

18. The mobility service providing apparatus of claim 10, wherein when the IT device is registered in the vehicle, the vehicle moves toward the customer using an ID of the IT device.

* * * * *